United States Patent
Shapira

(10) Patent No.: US 9,464,414 B2
(45) Date of Patent: Oct. 11, 2016

(54) HOUSEHOLD ELECTRONIC MIXING-VALVE DEVICE

(71) Applicant: SMARTAP A.Y LTD, Haifa (IL)

(72) Inventor: Yuval Shapira, Haifa (IL)

(73) Assignee: SMARTAP A.Y LTD., Hamesila, Nesher (IL)

( * ) Notice: Subject to any disclaimer, the term of this patent is extended or adjusted under 35 U.S.C. 154(b) by 0 days.

(21) Appl. No.: 14/012,379

(22) Filed: Aug. 28, 2013

(65) Prior Publication Data

US 2014/0069516 A1    Mar. 13, 2014

Related U.S. Application Data

(63) Continuation-in-part of application No. PCT/US2012/026678, filed on Feb. 27, 2012, and a continuation-in-part of application No. 13/204,805, filed on Aug. 8, 2011.

(51) Int. Cl.

| | |
|---|---|
| *G05D 23/19* | (2006.01) |
| *E03C 1/04* | (2006.01) |
| *E03C 1/05* | (2006.01) |
| *F16K 11/00* | (2006.01) |
| *G05D 23/13* | (2006.01) |

(52) U.S. Cl.
CPC ............... *E03C 1/04* (2013.01); *E03C 1/055* (2013.01); *F16K 19/006* (2013.01); *G05D 23/1393* (2013.01); *Y10T 137/2499* (2015.04); *Y10T 137/2529* (2015.04); *Y10T 137/776* (2015.04); *Y10T 137/87684* (2015.04)

(58) Field of Classification Search
CPC ........ E03C 1/04; E03C 1/055; F16K 19/006; G05D 23/1393; Y10T 137/2499; Y10T 137/2521; Y10T 137/2529; Y10T 137/776; Y10T 137/87684
USPC .......... 137/100, 101.19, 606, 487; 236/12.12
See application file for complete search history.

(56) References Cited

U.S. PATENT DOCUMENTS

| | | | | |
|---|---|---|---|---|
| 3,055,389 | A * | 9/1962 | Brunner | 137/487 |
| 3,776,265 | A * | 12/1973 | O'Connor, Jr. | 137/487.5 |
| 3,875,955 | A * | 4/1975 | Gallatin et al. | 137/14 |
| 4,061,155 | A * | 12/1977 | Sopha | 137/85 |
| 4,277,832 | A * | 7/1981 | Wong | 364/510 |
| 4,420,811 | A * | 12/1983 | Tarnay et al. | 700/285 |
| 4,674,678 | A * | 6/1987 | Knebel et al. | 236/12.12 |
| 4,693,415 | A * | 9/1987 | Sturm | 236/12.12 |
| 4,694,512 | A * | 9/1987 | Knebel et al. | 4/668 |
| 4,756,030 | A * | 7/1988 | Juliver | 4/668 |
| 4,796,651 | A * | 1/1989 | Ginn et al. | 137/8 |
| 5,033,671 | A * | 7/1991 | Shiba et al. | 236/12.12 |
| 5,190,068 | A * | 3/1993 | Philbin | 137/8 |

(Continued)

*Primary Examiner* — William McCalister
(74) *Attorney, Agent, or Firm* — Marc Van Dyke; Fourth Dimension IP

(57) ABSTRACT

A household electronic mixing-valve faucet for controlling a temperature of a mixed stream discharging from the faucet, including: (a) a faucet body; (b) a controller; (c) a first powered valve fluidly connected to the hot water flowpath; (d) a second powered valve fluidly connected to the cold water flowpath; (e) an arrangement adapted to determine extents of opening of the valves; (f) temperature sensors, operative to sense a temperature of fluids within the hot and cold water flowpaths; and pressure sensors; the controller adapted to maintain a difference between an actual temperature of the mixed stream and a setpoint temperature thereof within a particular range.

12 Claims, 8 Drawing Sheets

(56) References Cited

U.S. PATENT DOCUMENTS

| | | | |
|---|---|---|---|
| 5,331,995 A * | 7/1994 | Westfall et al. | 137/8 |
| 5,388,607 A * | 2/1995 | Ramaker et al. | 137/88 |
| 5,590,686 A * | 1/1997 | Prendergast | 137/597 |
| 6,446,875 B1 * | 9/2002 | Brooks et al. | 236/12.12 |
| 6,676,024 B1 * | 1/2004 | McNerney et al. | 236/12.12 |
| 6,705,534 B1 * | 3/2004 | Mueller | 236/12.12 |
| 7,448,553 B2 * | 11/2008 | Schmitt | 236/12.11 |
| 7,458,520 B2 * | 12/2008 | Belz et al. | 236/12.12 |
| 7,475,827 B2 * | 1/2009 | Schmitt | 236/12.11 |
| 7,543,596 B2 * | 6/2009 | Laverdiere et al. | 137/14 |
| 7,584,898 B2 * | 9/2009 | Schmitt et al. | 236/12.12 |
| 7,802,733 B2 * | 9/2010 | Schmitt | 236/12.12 |
| 7,828,010 B2 * | 11/2010 | Diesing et al. | 137/508 |
| 7,832,651 B2 * | 11/2010 | Rivlin | 236/12.13 |
| 8,028,355 B2 * | 10/2011 | Reeder et al. | 4/623 |
| 2004/0193355 A1 * | 9/2004 | Faymon et al. | 701/100 |
| 2006/0231638 A1 * | 10/2006 | Belz et al. | 236/12.12 |
| 2007/0001018 A1 * | 1/2007 | Schmitt et al. | 236/12.12 |
| 2007/0246550 A1 * | 10/2007 | Rodenbeck et al. | 236/12.11 |
| 2007/0246564 A1 * | 10/2007 | Rodenbeck et al. | 239/67 |
| 2008/0164331 A1 * | 7/2008 | Schmitt | 236/12.17 |
| 2008/0203195 A1 * | 8/2008 | Schmitt | 239/548 |
| 2008/0245422 A1 * | 10/2008 | McTargett | 137/487.5 |
| 2009/0039176 A1 * | 2/2009 | Davidson et al. | 239/67 |
| 2009/0277508 A1 * | 11/2009 | Pohl et al. | 137/88 |
| 2010/0044604 A1 * | 2/2010 | Burke et al. | 251/129.04 |
| 2010/0108165 A1 * | 5/2010 | Rodenbeck et al. | 137/801 |
| 2011/0114187 A1 * | 5/2011 | Sawaski | 137/1 |
| 2012/0103426 A1 * | 5/2012 | Galeotti | 137/2 |

* cited by examiner

HOUSEHOLD ELECTRONIC MIXING-VALVE DEVICE

FIELD AND BACKGROUND OF THE INVENTION

The present invention relates to household mixing-valve devices and, more particularly, to household electronic thermostatic mixing-valve devices.

In the household, electronic thermostatic mixing valves or faucets may be used to mix relatively hot and cold water streams to provide a mixed stream of a substantially fixed temperature, by electronically adjusting one or more valve members in response to a set point, typically a set point of the user. Such mixing valves may be installed in the bathroom or shower, by way of example.

Though the design of such a device might appear to be fairly straightforward, there exist numerous and often-contradictory requirements for the design, including response time, safety, reliability, and ease of maintenance. Of course, the design is also constrained by the need to produce and provide the device at a cost that enables market penetration.

Electronic faucets typically implement a closed-loop control of some kind, which may potentially become unstable, and may result in the dispensing of dangerously-hot water to the user. It is therefore highly important to eliminate, minimize, or at least greatly reduce the possibility of such instabilities.

In domestic water systems, the task of stable control over the mixed water stream parameters is complicated by the diversity of the inlet conditions to the mixing valve. For example, the cold water temperature may vary from virtually 0° C. in cold weather to as much as 30° C. in hot weather. The hot water temperature may be as high as 80° C. or more, e.g., when the hot water is drawn directly from a solar boiler or gas heater, and may be as low as the temperature of the cold water. Typically, the hot water temperature may lie within a rather broad range of 40° C. to 75° C.

Significantly, the inlet pressures to the mixing valves may vary, or fluctuate, within a range of about 1.5 to 7 bar (gauge) depending on the supplier, the consumption, and the height of the consumer location.

Also significantly, the outlet may be supplied with a flow restricting device, limiting the flow rate through the device. The use of restriction is required by some of the modern codes. While approaching the limitation flow rate, most of the inlet pressure falls on the outlet restriction while a small portion of the pressure is applied to the mixing valve itself. The resulting low flow rate also reduces the response time of temperature sensing elements that may be installed inside the mixing valve, due to reduced convection.

Household thermostatic mixing faucets may require sub-second response times, in order to effectively respond to abrupt situations when the cold supply pressure momentarily drops, for example, after an abrupt opening of a connected, alternative or auxiliary water conduit, or due to a catastrophic failure or explosion of a cold-water pipe.

In relating to the control of thermostatic mixing faucets, some known devices utilize a single temperature sensor on the mixed flow to provide a feedback for the control loop.

Other known devices are disclosed by U.S. Patent Publication No. 20060231638 and U.S. Pat. No. 4,756,030, both of which are incorporated by reference for all purposes as if fully set forth herein. The flow through the two inlets is measured together with the inlet temperatures, and an additional temperature sensor may be added to measure the temperature of the mixed flow. Based on the set points, the measured inlet temperatures, and using Richmann's rule of mixing, the required flow rates through each inlet are calculated. A controller uses the measurements from the flow sensors and moves the valves in order to maintain the calculated flow.

Other known devices are disclosed by U.S. Pat. No. 4,694,512.

While various electronic thermostatic mixing faucets are known, to date, penetration into the household market has been limited. And while some technological advances have been made, the present inventor has recognized a need for further improvements in the response behavior, safety, robustness, and ease of maintenance, while provided a cost-effective design and product. The subject matter of the present disclosure and claims is aimed at fulfilling this need.

SUMMARY OF THE INVENTION

According to one aspect of the present invention there is provided a household electronic mixing-valve faucet for controlling a temperature and flowrate of a mixed stream discharging from the faucet, the faucet including: (a) a faucet body including: (i) a hot water inlet, adapted to connect to a hot water source, and fluidly connected to a hot water flowpath; (ii) a cold water inlet, adapted to connect to a cold water source, and fluidly connected to a cold water flowpath, the inlets fluidly connecting at a junction on the faucet body; and (iii) a faucet outlet, adapted to deliver a stream received from the water flowpaths, via the junction; (b) a controller; (c) a first powered valve fluidly connected to the hot water flowpath, the valve responsive to the controller; (d) a second powered valve fluidly connected to the cold water flowpath, the second valve responsive to the controller; (e) at least one arrangement adapted to determine an extent of opening of the first powered valve and an extent of opening of the second powered valve; (f) a first temperature sensor and a second temperature sensor, the sensors associated with the faucet body, and operative to sense, respectively, a first temperature of a first fluid within the hot water flowpath, upstream of the first powered valve and a second temperature of a second fluid within the cold water flowpath, upstream of the second powered valve; (g) at least a first component of a first pressure sensor and at least a first component of a second pressure sensor, the components of the sensors associated with the faucet body, the first component of the first sensor operative to contact the first fluid within the hot water flowpath, upstream of the first powered valve, the component of the second sensor operative to contact the second fluid within the cold water flowpath, upstream of the second powered valve; and (h) at least one component of another pressure sensor, the component disposed downstream with respect to the powered valves, the controller adapted to receive: extent of opening information, from the arrangement, pertaining to the extent of opening of each of the powered valves; temperature information from the temperature sensors; and pressure information from all of the pressure sensors, the controller being further adapted to: (i) determine a first desired flowrate (Qh) of the first fluid through the hot water flowpath, and a second desired flowrate (Qc) of the second fluid through the cold water flowpath, based on a desired total mixed stream flowrate input, and a desired mixed stream temperature input; (ii) subsequently calculate desired valve coefficients (Ch,Cc) for the first and the second powered valves as a function of the required flow rates (Qh, Qc), and as a function of a first pressure differential and a second pressure differential; (iii) determine the desired extent of opening for each of the powered valves based on pre-calibrated valve coefficients of the powered valves; and (iv) control the powered valves based on the desired extents of opening, to maintain a difference between an actual temperature of the mixed stream and a setpoint temperature thereof within a particular range.

According to further features in the described preferred embodiments, the faucet further includes a third temperature sensor, disposed downstream from the junction.

According to still further features in the described preferred embodiments, the controller is adapted to modify the desired extents of opening based on a feedback control scheme utilizing an input from the third temperature sensor.

According to still further features in the described preferred embodiments, the controller is adapted to effect the control in a mathematically independent fashion with respect to a discrete pressure at every point downstream of the powered valves.

According to still further features in the described preferred embodiments, the desired valve coefficients are an explicit function of the pressure differentials and the desired flow rates (Qh, Qc).

According to still further features in the described preferred embodiments, the controller is adapted, within a particular loop iteration, to produce a calculated feed forward control result from the actual pressure differentials and the temperature information; to effect, within the particular control loop iteration, a combination of the calculated feed forward control result and a calculated feed back control result from the feedback control scheme; and to calculate the desired extents of opening of the powered valves based on the combination.

According to still further features in the described preferred embodiments, a pressure dependency of the desired extents of opening for each of the powered valves is solely a function of the pressure differentials.

According to still further features in the described preferred embodiments, any pressure dependency of the desired extents of opening on discrete pressure is less than 10%, less than 7%, less than 5%, less than 3%, or less than 1%, in absolute terms, of a pressure dependency of the desired extents of opening on the pressure differentials.

According to still further features in the described preferred embodiments, at least one of the calibrated relationships relating the flowrates of the first and second fluids is a measured calibrated relationship obtained by applying at least one differential pressure for a plurality of extents of opening, and measuring flowrates corresponding thereto.

According to still further features in the described preferred embodiments, the controller further is adapted to control the powered valves based on the desired extents of opening, whereby a difference between the flowrate of the mixed stream and a set-point flowrate thereof, is kept within a second particular range.

According to still further features in the described preferred embodiments, the faucet is installed in conjunction with a household or home-type receiving vessel.

According to still further features in the described preferred embodiments, the faucet is installed in conjunction with a household or home-type receiving vessel selected from the group consisting of a sink, a bath, and a shower stall.

According to an aspect of the invention, described herein, there is provided a method of controlling a temperature of a mixed stream discharging from a faucet.

According to an aspect of the invention, described herein, there is provided a method of controlling a temperature and flowrate of a mixed stream discharging from a faucet.

According to further features in the described preferred embodiments, the controller is adapted to control the powered valves based on the temperature and the actual pressure differentials, whereby a difference between an actual flowrate of the mixed stream and a set-point flowrate thereof, is kept within a second particular range.

According to still further features in the described preferred embodiments, the controller is adapted to control the powered valves based on the temperature information and the actual pressure differentials, whereby an actual flowrate of the mixed stream is maintained above 20 l/min and a pressure of the mixed stream is at least 0.5 bar.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
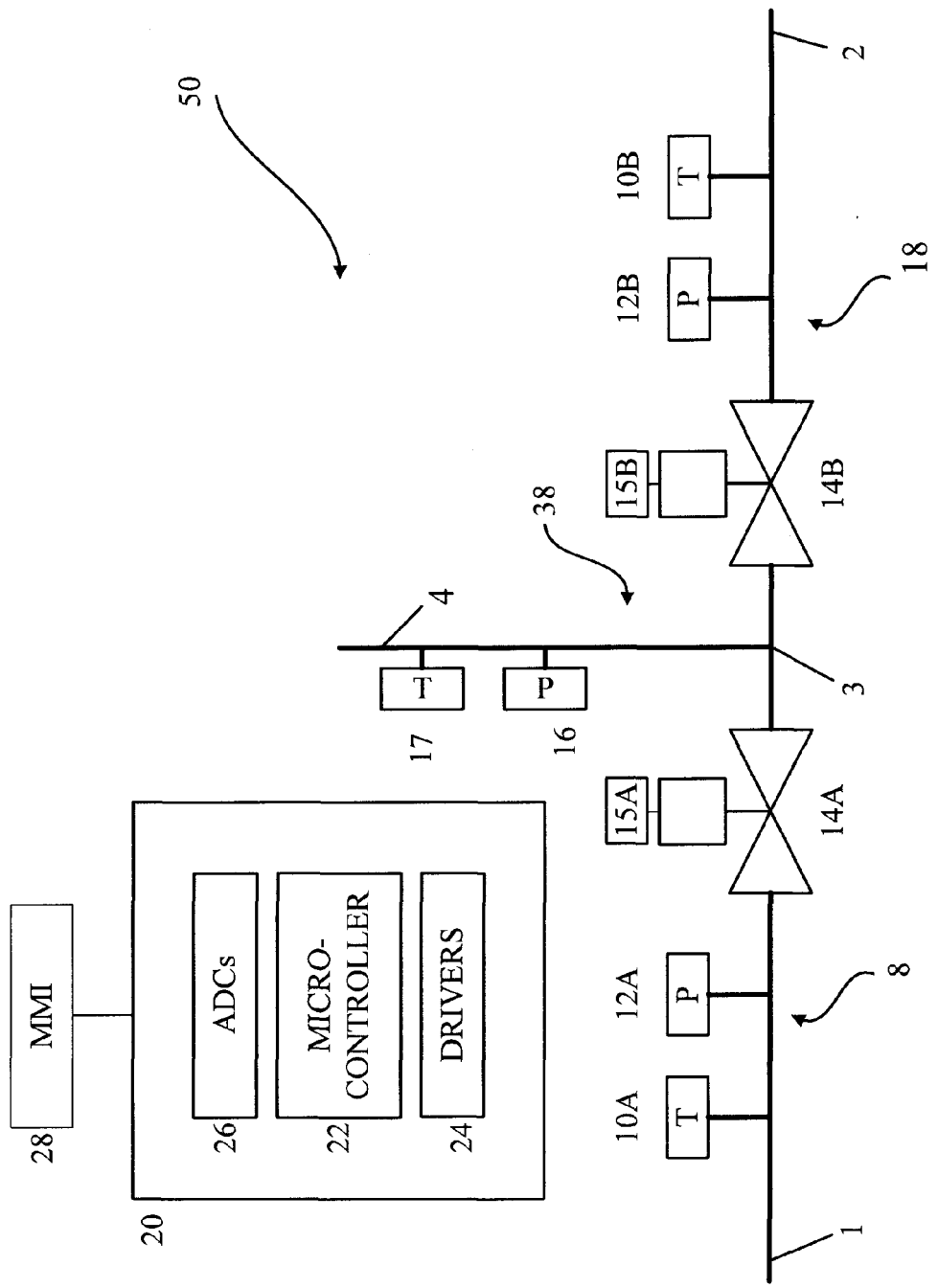
FIG. 1 provides a schematic illustration of an exemplary electronic mixing valve device, according to one embodiment of the present invention.

The principles and operation of the electronic mixing-valve device according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

I have found problematic, the control of thermostatic faucets by utilizing a single temperature sensor on the mixed flow to provide feedback for the control loop. In this configuration, there is no one-to-one mapping between the desired temperature and the extent of opening of the valves. In addition, there exists a variable delay between a change in the extent of opening of the valves and the measured change in the temperature, depending on the unknown flowrate. Thus, there is a need to accurately measure the mixed stream temperature, which may necessitate some means of accelerating the mixing of the inlet water streams. Moreover, the uncertainty in the physical parameters of the hot and cold inlet streams results in a control system having an undetermined degree of responsivity: a given change in the position of a valve (extent of opening) may result in highly varying changes with respect to the output temperature. As a result, control loops based on a single, mixed-stream temperature sensor may not produce satisfying results in various input scenarios. A control loop that is well tuned, based on a particular set of inlet parameters, may produce high temperature overshoots, or even become unstable, under a different set of inlet conditions. The limitations of this control method may be mitigated, to a small degree, by installing additional temperature sensors on the inlets, and providing the controller with the temperature data.

In a more advanced system, the flow through the two inlets may be measured along with the inlet temperatures. A controller utilizes the measurements from the flow sensors and moves the valves in order to maintain the calculated flow, based on Richmann's rule of mixing. This control system is much superior to the previously described system based solely on temperature measurement, and may partially correct some of the deficiencies thereof. However, I have identified, in this more advanced system, significant drawbacks and sources for instability.

Perhaps most importantly, I have observed that the knowledge of the flow rates through the inlets, at a given time, does not determine the extent of opening of the valves requisite to obtain a pre-determined or set-point flow rate for the outlet stream. By way of example: at higher inlet pressures, a small change in the position of a valve may be sufficient to obtain the requisite flow rate, while at lower inlet pressures, a larger change in the valve position may be required. Such uncertainty requires to control the flow rate through each valve in a feed-back manner, when the valve position is corrected based on the difference between the required and the measured flow. This feedback control loop may suffer instabilities when the inlet pressures are substantially different from the pressures for which the loop was optimized. Thus, even in this relatively advanced control system, responsivity may be highly unpredictable.

Moreover, the use of various types of conventional flow sensors may cause different kinds of problems. Flow sensors based on turbines may promote wearing of the bearings and reduce the flowrate of the water. They may be particularly susceptible to malfunctioning due to the deposition of dirt and scale. It may be generally disadvantageous to utilize sensors having moving parts that come in direct contact with flowing water, due to extensive wearing, particularly under hard water conditions. Other types of flow sensors are based on heat dissipation from a hot element by convection. Such sensors may inherently require a hefty power consumption, which may render impractical the use of autonomous power sources such as batteries. Such sensors may also suffer from long response times. Other types of flow sensors, such as those based on vortex shedding, may also suffer from long response times.

Many types of flow sensors require laminar flow and a relatively long stretch of straight piping, which may impractically increase the dimensions of the system.

In summary, the introduction of various types of flow sensors into an electronic mixing-valve device may result in a shorter device lifespan, require large device dimensions, and achieve long response times. Moreover, the techno-economic viability of the electronic mixing-valve device may be greatly constrained by the frugality of household consumers.

Instead of flow measurements, the present invention uses pressure measurements as input to the control loop. To this end, pressure sensors may advantageously be disposed both upstream and downstream of each powered valve. I have found that pressure sensors may have appreciably improved response time relative to flow sensors, at least in part because pressure sensors measure changes in force and not the integrals thereof. I have further found that by pre-calibrating valve hydraulic characteristics as a function of pressure, and by inputting the pressure differentials between upstream and downstream sensors to the controller, the control algorithm may accurately calculate or determine (from those pressure differentials, typically directly) the required degree of opening of the powered valves, rather than the required flow rate through each valve, as taught by the prior art. Therefore, this arrangement obviates the need for a flow feedback loop through each valve and hence improves the stability of the system for any set of varying pressure conditions. Thus, the device and method of the present invention completely and inherently compensate for uncertainties in the system due to a wide span of inlet conditions, resulting in a robust, closed-loop system that may be free or substantially free of stability issues.

Referring now to the drawings, FIG. 1 provides a schematic illustration of an exemplary electronic thermostatic mixing valve faucet or device 50, according to one embodiment of the present invention. Thermostatic faucet 50 includes a hot water inlet 1, adapted to connect to a hot water source (not shown), and fluidly connected to a hot water flowpath 8, and a cold water inlet 2, adapted to connect to a cold water source (not shown), and fluidly connected to a cold water flowpath 18. Flowpaths 8 and 18 converge at a mixing junction 3 to produce a mixed water stream, which flows through a mixed stream water flowpath 38 before being discharged from faucet 50 via a mixed stream or faucet outlet 4.

Thermostatic faucet 50 may include a first powered valve fluidly connected to hot water flowpath 8, and a second powered valve 14B fluidly connected to cold water flowpath 18. Associated with powered valves 14A, 14B is at least one extent of opening evaluator or arrangement 15A, 15B adapted to measure, monitor or evaluate an extent of opening of each of powered valves 14A, 14B. Typically, each powered valve 14A, 14B is equipped with a respective arrangement 15A, 15B, each of which is operative to measure a position of its respective valve 14A, 14B with respect to a fully closed position thereof.

Hot water flowpath 8 of faucet 50 includes a first temperature sensor 10A and at least a first pressure sensor 12A, associated with a body of faucet 50, and operative to sense, respectively, a temperature and a pressure of a first fluid within hot water flowpath 8. First pressure sensor 12A may advantageously be disposed upstream of powered valve 14A. Similarly, cold water flowpath 18 of faucet 50 further includes a second temperature sensor 10B and at least a second pressure sensor 12B, associated with a body of faucet 50, and operative to sense, respectively, a temperature and a pressure of a second fluid within cold water flowpath 18. Second pressure sensor 12B may advantageously be disposed upstream of powered valve 14B.

Thermostatic faucet 50 may include a downstream pressure sensor 16, associated with mixed stream water flowpath 38 within faucet 50, and operative to sense a pressure of the mixed water stream flowing within mixed stream water flowpath 38. Thermostatic faucet 50 may include a temperature sensor 17, disposed downstream with respect to junction 3, and operative to sense a temperature of the mixed water stream flowing within flowpath 38.

Temperature sensors 10A, 10B, and 17, and pressure sensors 12A, 12B, and 16, may be operative to provide temperature and pressure information, respectively, to a controller 22. Powered valves 14A, 14B are responsive to controller 22. The operation of controller 22 will be described in greater depth hereinbelow.

Thermostatic faucet 50 may include an electronic board 20 for housing controller (typically a micro-controller) 22, and a plurality of analog-to-digital converters (ADCs) such as ADC 26. Each ADC 26 may be disposed within controller 22. Typically, each ADC 26 is adapted to receive signals from the various sensors, to sample them and to convert into digital signals.

Thermostatic faucet 50 may further include at least two drivers such as driver 24, each driver 24 operative to drive one of powered valves 14A and 14B. In an exemplary case in which valves 14A and 14B are powered by DC motors, each driver 24 may advantageously be an H-bridge.

A man-machine-interface (MMI) module 28 may be used to input setpoints and/or display parameters relating to properties such as mixed flow properties. MMI module 28 may be connected by wire or wirelessly to board 20.

It will be appreciated by one of ordinary skill in the art that the geometry of the powered valve, along with the drive method, may determine the type, design and configuration of extent of opening evaluators 15A and 15B. For a valve controlled by a rotating shaft, by way of example, a rotating motor may be connected to provide the means for electronic control over the valve. The degree of opening of the valve may then be determined by the rotational angle of the valve shaft. When a stepper motor drives the valve, the counter that counts the number of the commanded steps can serve as a main component of arrangement or evaluators 15A and 15B. In the case of a DC motor, a measurement of the back EMF can be used to calculate the motor speed, and by integration the motor rotation angle (http://www.acroname.com/robotics/info/articles/back-emf/back-emf.html). In this case, evaluators 15A and 15B would encapsulate the motor driver together with a software routine and an ADC converter for measuring the voltage across the motor windings. In another embodiment, arrangement 15A and 15B may include a potentiometer and an ADC converter. By measuring the resistance change of the potentiometers, the angular movement of the valve shaft may be deduced. In yet another embodiment, opto-couple or Hall-effect encoders can be used to calculate the angular movement of the valve shaft.

Figure 2:
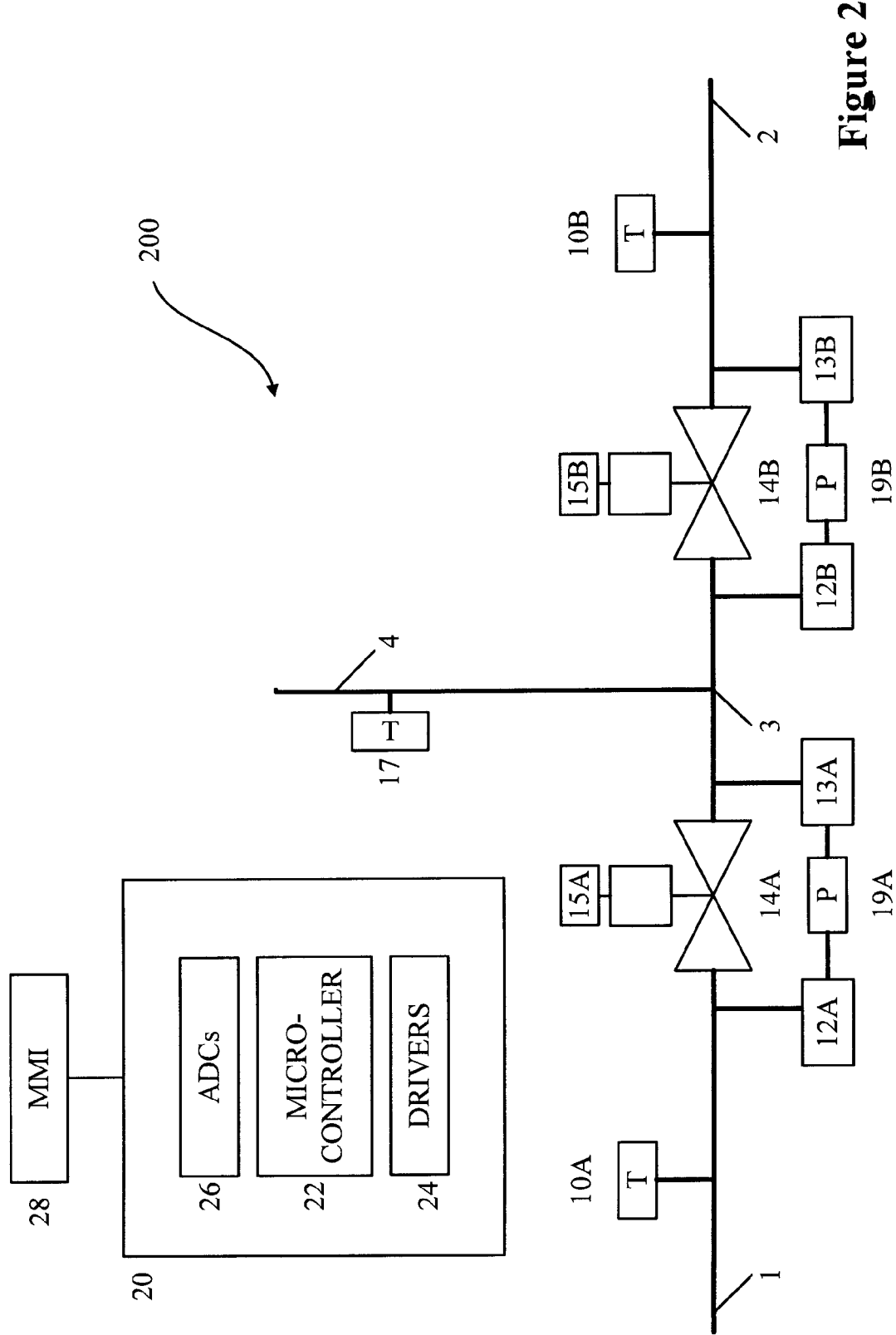
FIG. 2 provides a schematic illustration of an exemplary electronic mixing valve device, according to another embodiment of the present invention.

In another exemplary embodiment of a thermostatic faucet or device 200 according to the present invention, shown in FIG. 2, a second hot water flowpath pressure sensor 13A may be disposed along hot water flowpath 8, downstream with respect to powered valve 14A. Similarly, a second cold water flowpath pressure sensor 13B may be disposed along hot water flowpath 18, downstream with respect to powered valve 14B. It may be particularly advantageous to utilize a single, differential pressure sensor unit 19A that is operative to measure a differential between the upstream pressure and the downstream pressure of powered valve 14A. Similarly, a differential pressure sensor unit 19B may be used to measure a differential between the upstream pressure and the downstream pressure of powered valve 14B. In this case, pressure sensors 12A, 13A may essentially be first and second components of differential pressure sensor unit 19A, and pressure sensors 12B, 13B may essentially be first and second components of differential pressure sensor differential pressure sensor unit 19B.

The above arrangement may obviate the need for pressure sensor 16 (shown in FIG. 1). As above, temperature sensor 17 is an optional component of the device.

Figure 3:
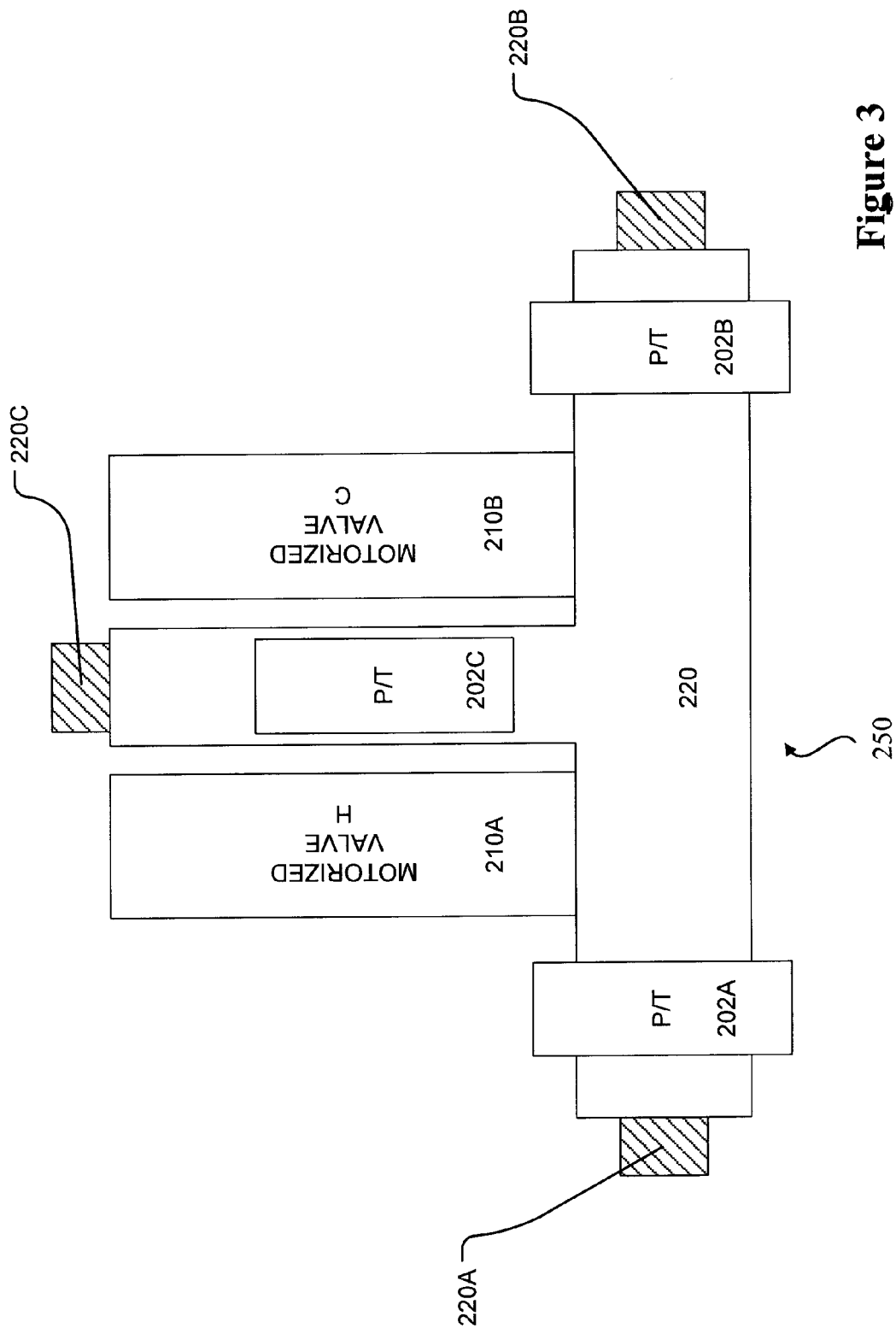
FIG. 3 is a schematic drawing of an exemplary mixing body, according to another embodiment of the present invention.

FIG. 3 is a simplified mechanical drawing of an exemplary mixing body 250, according to another embodiment of the present invention. This embodiment represents a specific hardware design based electronic faucet, based on the scheme provided in FIG. 1.

Mixing body 250 includes a housing 220 having a hot water inlet 220A, a cold water inlet 220B and a mixed water outlet 220C. Mixing body 250 further includes combined pressure/temperature sensors 202A, 202B and 202C, adapted to measure the temperature and the pressure of the hot, the cold and mixed water streams, respectively. Sensor units such as RPS 0-6 sensor units (Grundfos Holding A/S, Denmark) may be suitable.

Mixing body 250 further includes motorized valve units 210A and 210B, which are operative to control the water flows through the hot and the cold inlets, respectively, based on the control signals from drivers 24 (shown in FIG. 1) associated with controller 20. Motorized valves or valve assemblies 210A and 210B may be connected to housing 220 by means of complementary connectors such as complementary threaded surfaces (e.g., using standard threading). Thus, each of valves 210A and 210B may be an interchangeable unit that may be reversibly installed and reversibly removed or uncoupled from housing 220 in a simple and straightforward manner, for maintenance or replacement purposes.

Figure 4:
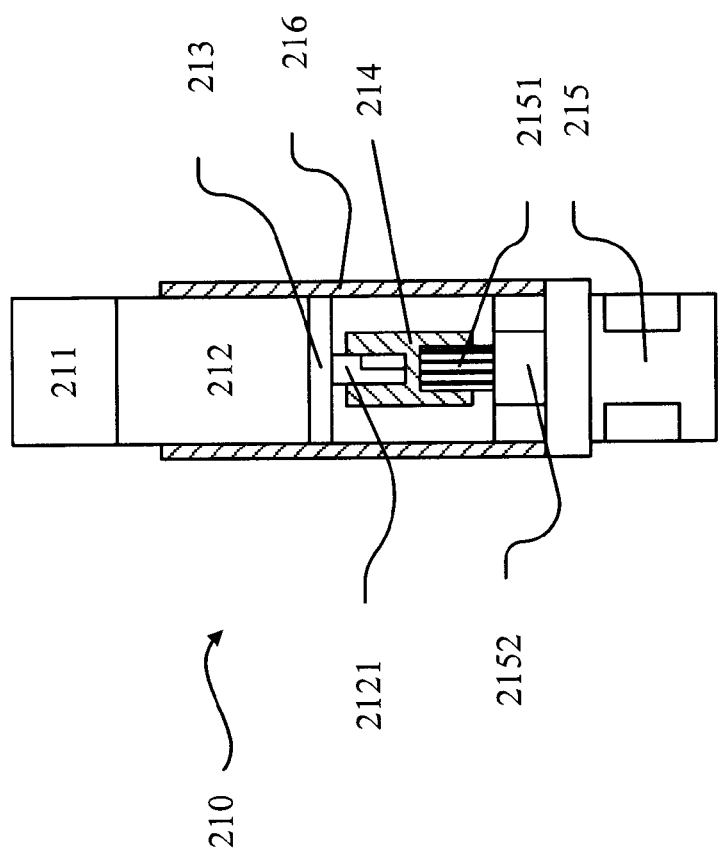
FIG. 4 is a schematic cross-sectional drawing of an exemplary motorized valve assembly, according to another embodiment of the present invention.

FIG. 4 is a schematic cross-sectional drawing of an exemplary motorized valve assembly 210, according to another embodiment of the present invention. Motorized valve assembly 210 may include a direct current (DC) motor 211, a gearbox 212, a hollow-shaft potentiometer 213 such as RH24PC by MegAuto KG (Putzbrunn-Munich, Germany), mechanically connected to a gear output shaft 2121 of motor 211, and a headwork valve 215, such as the Lifetime F118 ceramic headwork valve of Fluehs Drehtechnik GMBH (Luedenscheid-Bruegge, Germany). By rotating a valve shaft 2151 of valve 215 relative to a valve body 2152, the flow through valve 215 may be controlled. Gear output shaft 2121 may be connected to valve shaft 2151 by means of a coupling module 214. Motor 211, gearbox 212 and potentiometer 213 are advantageously interconnected whereby a voltage drop on the contacts (not shown) of motor 211 results in a rotation of shaft 2121 with respect to a body of gearbox 212, and to a corresponding change in the resistance of potentiometer 213, which is proportional to the angular change in shaft 2121. Coupling module 214 may be adapted to inhibit relative angular movement between shaft 2121 and valve shaft 2151. Moreover, valve body 2152 and gearbox 212 may be rigidly connected by means of a housing 216, whereby relative movement between gearbox 212 and valve body 2152 is substantially inhibited.

In motorized valve assembly 210, a bi-directional control over the extent of opening (θ) of valve 215 may be achieved by connecting the output of driver 24 (shown in FIGS. 1 and 2) to the electric contacts of motor 211, and θ may be monitored by measuring the rotation-dependent resistance of potentiometer 213.

With reference now to FIG. 1 as well, the user may set the desired temperature and flow of the mixed stream by means of MMI module 28. Given these set-points and based on the signals from the ADCs 26, controller 20 is designed and configured to send commands to the valve drivers 24 whereby the difference between the actual temperature of the mixed stream and the set-point temperature is kept within a particular or predetermined error margin. Subject to this constraint, the difference between the mixed stream flow and the set-point flow may then be minimized.

Figure 5A:
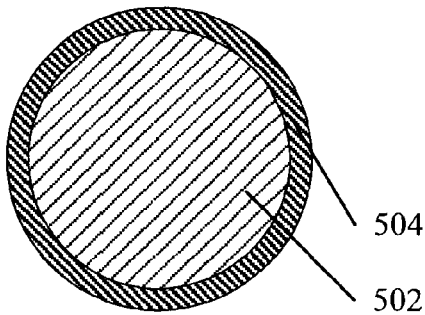
FIGS. 5A-5D are schematic cross-sectional drawings of a valve-body within a pipe, showing varying extents of opening, from fully closed to fully open.
Figure 5B:
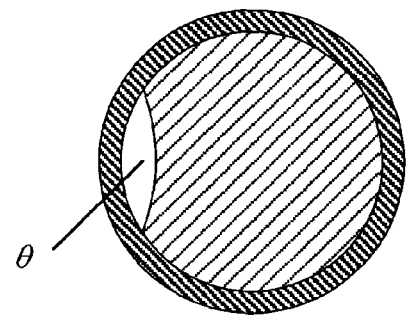
Figure 5C:
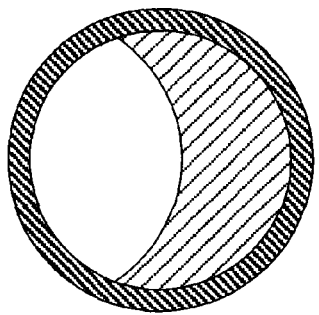
Figure 5D:
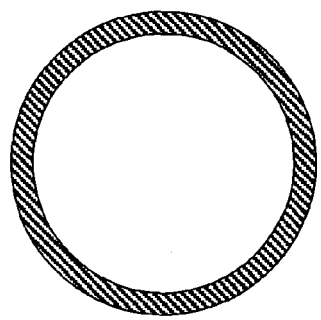

FIGS. 5A-5D are schematic cross-sectional drawings of a valve body 502 within a pipe 504, showing varying extents of opening (θ) for an exemplary ball-valve. In the cross-sectional drawing of FIG. 5A, pipe 504 is completely closed by valve-body 502, which may correspond to a θ of zero. In FIG. 5B, θ assumes a positive value; as valve body 502 assumes a smaller cross-section of pipe 504, θ increases (FIG. 5C), reaching some maximum value. In FIG. 5D, that maximum value corresponds to pipe 504 having a completely open cross-section.

As a valve handle (not shown) is rotated, valve body 502 may exhibit different extents of opening inside the pipe for flow of the water therethrough. Thus, for different degrees or extents of opening, different flow rates may be obtained.

Figure 6:
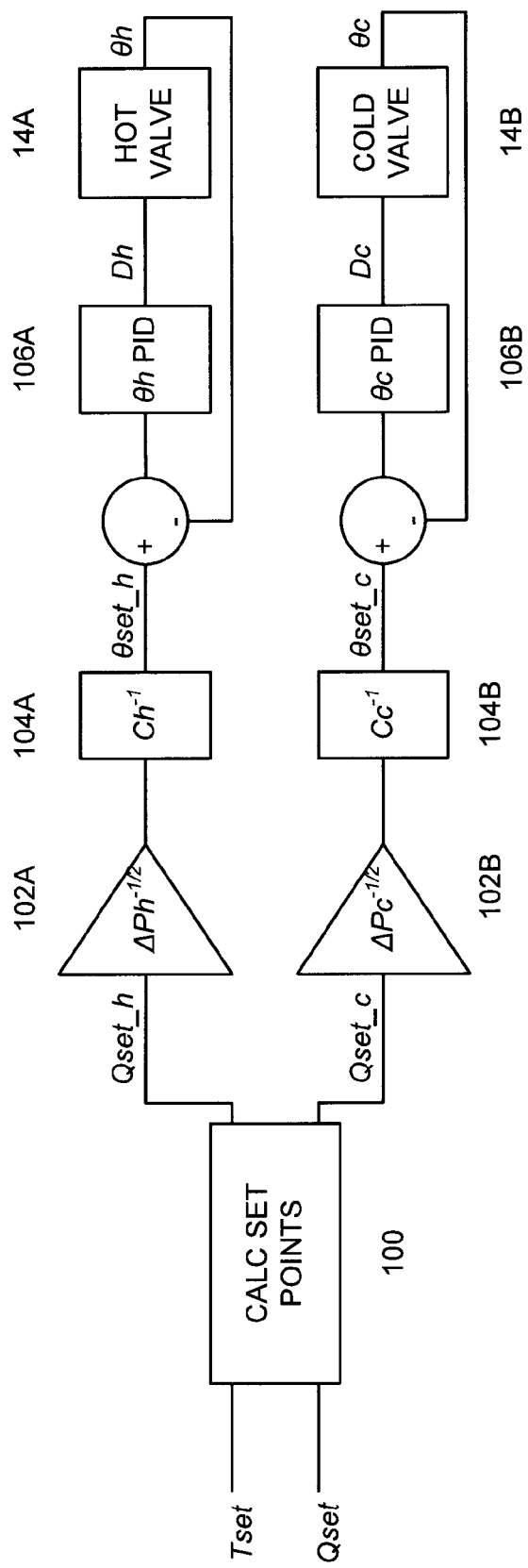
FIG. 6 provides an exemplary logical flow diagram for a controller of the electronic mixing valve device, according to another embodiment of the present invention.

FIG. 6 provides an exemplary logical flow diagram for controller 22, according to another embodiment of the present invention. Definitions of various terms are provided below:

Qh—flowrate through hot inlet 1
Qc—flowrate through cold inlet 2
Qm—flowrate through mixed outlet 4
Th—temperature of the stream in hot inlet 1 (hot water flowpath 8)
Tc—temperature of the stream in cold inlet 2 (cold water flowpath 18)
Tm_calc—calculated temperature of the stream discharged via mixed outlet 4
Tm_meas—actual temperature of the stream discharged via mixed outlet 4, as measured by sensor 17
Ph—pressure upstream of valve 14A (gauge pressure)
Pc—pressure upstream of valve 14B (gauge pressure)
Pi—Pc or Ph
Pmix—pressure downstream of valves 14A and 14B (gauge pressure)
ΔPh=Ph−Pmix—pressure drop over valve 14A
ΔPc=Pc−Pmix—pressure drop over valve 14B
θh—extent of opening of valve 14A as calculated by evaluator 15A
θc—extent of opening of valve 14B as calculated by evaluator 15B
Ch(θh)—valve coefficient of valve 14A
Cc(θc)—valve coefficient of valve 14B
Ci—Cc or Ch
Dh—drive signal to valve 14A
Dc—drive signal to valve 14B
Tset—temperature setpoint
Qset—flowrate setpoint
θset—extent of opening setpoint We assume the following:

Assumption (1) No heat is lost in the mixing valve. Then, the heat conservation equation reads:

$$\text{Tm\_calc} = \frac{Tc\,Qc + Th\,Qh}{(Qc + Qh)} \quad (1)$$

Assumption (2) No water is lost in the system. Thus, the conservation of mass reads:

$$Qm = Qc + Qh \quad (2)$$

Assumption (3) The flow through each valve is below the chocked flow regime of the valve. Thus, the following equation holds:

$$Qc = Cc(\theta c)\sqrt{\Delta Pc}$$

$$Qh = Ch(\theta h)\sqrt{\Delta Ph} \quad (3)$$

Assumption (4) Ch and Cc are monotonically increasing functions of θh and θc respectively, or at least there are regions θh∈[θmin_h, θmax_h], θc∈[θmin_c, θmax_c] in which this assumption holds. It may be required, or advantageous, to correct at least one or both of the required set points Tset and Qset. Tset may be limited to a pre-determined maximum temperature, for instance to 48° C. to reduce or avoid the risk of scalding. Qset may also be limited because of pressure limitation. The maximum allowable flow rate through the system is given by Qmax=max(Cc)√ΔPc+max(Ch)√ΔPh.

The control logic may then proceed to a set-point calculation block 100. Given (the possibly corrected values for) Tset and Qset, the desired flows through the hot and the cold inlets, Qset_h and Qset_c, respectively, may be calculated, based on Equations (1) and (2), in a set-point calculation block 100. The desired extents of opening of the hot and cold valves, θset_h and θset_c, respectively, are calculated by calculation blocks 102A, 104A, 102B and 104B, according to Equation (3) and Assumption (4):

$$\theta\text{set\_c} = Cc^{-1}(Q\text{set\_c}/\sqrt{\Delta Pc})$$

$$\theta\text{set\_h} = Ch^{-1}(Q\text{set\_h}/\sqrt{\Delta Ph}) \quad (4)$$

wherein $Ci^{-1}(x)$ is the inverse function of the function $Ci(x)$, such that $Ci^{-1}(Ci(x))=x$, where i stands for c or h.

Thus, given the (possibly corrected) desired flow parameters Tset and Qset, the measured inlets temperatures Tc and Th, and the measured pressure differentials (drops) ΔPc and ΔPh, the required opening angles of the valves are calculated deterministically in a feed-forward manner, through mathematical formulas (1)-(4). As long as the assumptions (1)-(4) hold, the obtained calculation yields a single solution such, that if the valves are placed according to this solution, the outlet flow parameters will be equal to the desired flow parameters, with no need to utilize a feedback control based on flow rates through one or both inlets, or outlet temperature.

We have found that, with regard to pressure measurements, it is generally insufficient to measure the inlet pressures alone. In one embodiment, the mixed water pressure is measured, in addition. In one embodiment, ΔPh and ΔPc may be measured directly, e.g., using differential pressure cells.

The inventive electronic mixing-valve faucet may be connected to a flow restriction element that increases the pressure at the outlet of the faucet. This flow restriction element may be, by way of example, a shower head or a diverter valve. The magnitude of the (increased) pressure at the mixing valve outlet (Pmix) will be higher for higher flow rates, because the pressure-drop over the restrictive element gets higher as the flow rate therethrough increases.

When the flow restriction element is present, the terms $\sqrt{\Delta Pi} = \sqrt{Pi - Pmix}$ in Eqs. (4) may be substantially different from the term $\sqrt{Pi}$, especially for high flow rates. Hence, using the term $\sqrt{Pi}$ in Eqs. (4) may cause significant errors in delivered flow rates, and corresponding error in the outlet temperature (through Eq. (1)), especially for high flow rates. Although the magnitude of the error may be reduced by limiting the mixed flow rate, this procedure may unnecessarily and disadvantageously limit the flow through the faucet.

The inventor notes that after obtaining the required flow rate through each channel, the calculations of the required degrees of opening of each valve are performed through a mathematically deterministic procedure described by Equations 4. These equations are mathematically independent of the discrete pressure upstream or downstream of the valves, and any pressure dependence may exclusively be attributed to the pressure differentials across the valves.

The inventor further notes that if the upstream and downstream pressure were changed by the same magnitude (at the same time) the resulting required angle would not change.

The inventor further observes that the equations used to calculate the required extent of opening (θ), given the desired flowrates (Qh and Qc), depend explicitly on the pressure differentials (ΔPh, ΔPc). Any dependency on Ph, Pc, and Pmix is implicit.

Minor dependencies on discrete pressure terms may not be overly detrimental to the control logic performance. In each of the various equations, any aggregated contribution of such terms should preferably be less than 10%, in absolute terms, of the contribution of the differential pressure term, and more typically, should be less than 7%, less than 5%, less than 3%, or less than 1%. By way of example, in the equation:

$$Qh = Ch(\theta h)\sqrt{Ph - 1.04 \times Pmix}$$

may be rearranged as $$Qh = Ch(\theta h)\sqrt{Ph - 0.04 \times Pmix}$$

For a ΔPh=2 bar and a Pmix=1 bar, the differential pressure term equals 2, while the discrete pressure term equals 0.04×1=0.04. Since both are within the same expression (raised to the ½ power), the relative contribution of the discrete pressure term to the result (in this case Qh), in absolute terms, is $$\left|\frac{\delta Qh}{Qh}\right| = \frac{1}{2} \times 0.04 \times \frac{Pmix}{\Delta Ph} = 0.01,$$

or 1%.

We have found that, in general, the dependence of Ci on the opening angle may be non-linear. For example, in the case of the above-referenced F118 ceramic headwork valve, the least-square linear fit of Ci vs. θ function produced significant errors. For instance, at an opening of 70°, the flow rate estimation error due to linearization alone (without taking into consideration the errors in pressure sensors, positioning sensor and calibration) is $$\frac{\delta Q}{Q} = 18\%,$$

while at an opening of 50°, the flow rate estimation error due to linearization alone is $$\frac{\delta Q}{Q} = -16\%.$$

Failing to converge towards the desired flow rate will inevitably cause the actual outlet temperature to disadvantageously diverge from the value predicted by Eq. (1). By linearizing Eq. (1), the temperature error due to errors in actual flow rates is obtained:

$$\delta T = \Delta T_{HC} \frac{Q_C \delta Q_H - Q_H \delta Q_C}{(Q_C + Q_H)},$$

where $\Delta T_{HC}$ is the difference between the hot and the cold inlet temperatures. Let us assume, by way of example, the following parameters:

$$T_H = 63°, T_C = 13°, T_{SET} = 38°, Q_{SET} = 100 \text{ [l/min]}$$

$$P_H = 0.9, P_C = 5.8, P_{MIX} \cong 0 \text{ [bar]}$$

According to the procedure described above, the required flow rates and valve coefficients in these conditions are $Q_H = Q_C = 5$ l/min, $C_{VH} = 5.24$, $C_{VC} = 2.1$. The resulting opening angles for a linearized model are $\theta_H = 70°$, $\theta_C = 50°$. Hence $$\frac{\delta Q_H}{Q_H} - \frac{\delta Q_C}{Q_C} \cong 17\% \to \delta T = 4.3°.$$

This means that instead of obtaining the mixed output stream temperature at a close to comfortable 38°, the actual mixed temperature becomes uncomfortably hot (42.3°). The position of each of valves 14A, 14B may be controlled using PID controllers 106A and 106B, respectively. PID controllers 106A and 106B drive their corresponding valves 14A, 14B by means of drivers 24 (shown and described hereinabove) and based on the control variables.

Figure 7:
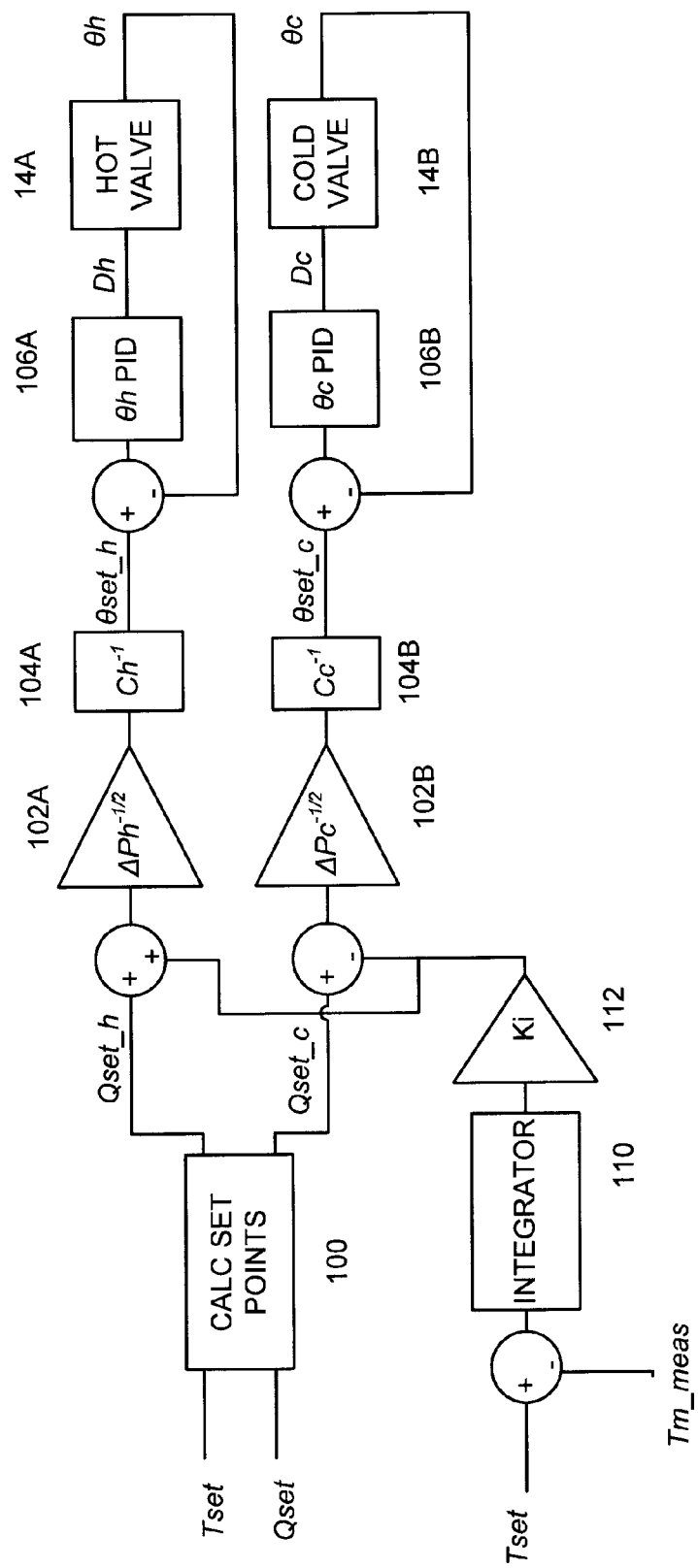
FIG. 7 provides a second exemplary logical flow diagram for the controller, according to another embodiment of the present invention.
Figure 8:
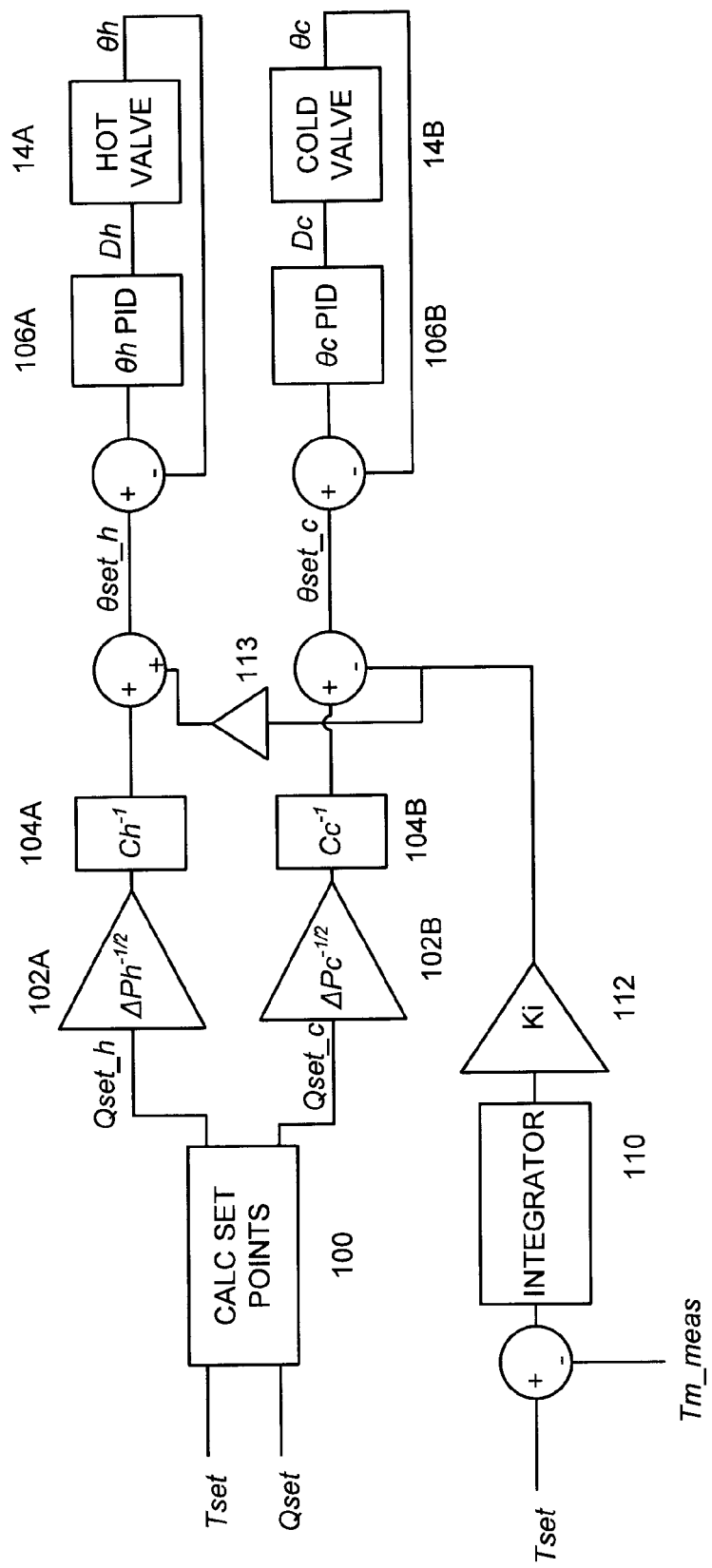
FIG. 8 provides a third exemplary logical flow diagram for the controller, according to another embodiment of the present invention.

Due to errors in pressure measurements, temperature measurements of the inlets, errors during the calibration of functions Cc and Ch, and errors in θh and/or θc, the actual temperature at the outlet Tm_meas can be different from the calculated mixed stream temperature Tm_calc. As a means of compensation, another embodiment of controller 22, described in FIG. 7, integrates the temperature error by block 110, multiplies it by an integrator gain 112 and adds the resulting value, with different signs, to the calculated set points Qset_h and Qset_c. A similar control configuration (and method) is provided in FIG. 8. However, an output of integrator gain 112 is provided to the basic control loop after blocks 104A and 104B. To allow further versatility, for example, when powered valves 14A and 14B are of different types, an additional gain 113 may be incorporated in the control scheme. By way of example, if powered valve 14A has a range of 180 degrees, and powered valve 14B has a range of 90 degrees, a movement of two degrees in the 180 degree valve may roughly correspond to a movement of one degree in the 90 degree valve, and gain 113 would be 2.0.

While those of ordinary skill in the art may appreciate that there exist various methods of calibrating a valve to determine the valve constant, the calibration procedure of the function C may readily be performed as follows:

a) for each degree of opening θ, apply different pressures drops ΔP over the valve to be calibrated, by, for instance, limiting the flow by means of another valve located upstream or downstream of the valve to be calibrated;

b) for ΔP set, measure the ΔP and the flow rate through the valve to be calibrated, Q;

c) plot the points $(\sqrt{\Delta P}, Q)$;

d) find the best linear trendline among the lines $Q=m \times \sqrt{\Delta P}$ that minimizes the root-mean-square error between the line and the measured points $(\sqrt{\Delta P}, Q)$, wherein m is the slope of the line; and e) determine $C(\theta)=m$.

As used herein in the specification and in the claims section that follows, the term "pressure sensor" is meant to include sensors measuring absolute pressure or relative (or differential) pressure. The relative pressure may be with respect to the atmosphere, to another particular or predetermined pressure, or to another pressure within the thermostatic mixing-valve device or within any of the water flow paths.

As used herein in the specification and in the claims section that follows, the term "another pressure sensor", with respect to a first pressure sensor and a second pressure sensor, refers either to at least one of the first and second pressure sensors, or to an additional pressure sensor (such as a third pressure sensor), distinct from the first and second pressure sensors.

As used herein in the specification and in the claims section that follows, the terms "differential pressure" and "pressure drop over a valve" and the like, refer to a difference between an upstream pressure and a downstream pressure with respect to a valve within the system.

As used herein in the specification and in the claims section that follows, the terms "discrete pressure information", "discrete pressure" and the like refer to absolute pressure information or to pressure information that is relative to the atmosphere or to a standard that is independent of pressure within the thermostatic mixing-valve device or within any of the water flow paths. The term "discrete pressure information" is specifically meant to exclude any expression forming a portion of a "differential pressure" term. For example, the term discrete pressure information would exclude the expression K×(Ph−Pmix). The term discrete pressure information would also exclude an identical (but differently expressed) term such as K×Ph−K×Pmix. As used herein in the specification and in the claims section that follows, the term "household electronic mixing-valve faucet", and the like, refers to a faucet adapted for installation into home-type water systems having a first pipe providing water from a hot-water supply such as a boiler, and a second pipe providing water from a cold-water supply such as a main cold water supply line (e.g., connected with a municipal water network), within a home, the faucet adapted for use in conjunction with a sink, such as a kitchen or bathroom sink, a bath, a shower stall, or the like. The term "household" is specifically meant to include apartment buildings, hotels, hospitals, and other such consumer-based facilities having sinks, baths, shower stalls, etc.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

What is claimed is:

1. A household electronic mixing-valve faucet for controlling a temperature and flowrate of a mixed stream discharging from the faucet, the faucet comprising:

(a) a faucet body including:
(i) a hot water inlet, adapted to connect to a hot water source, and fluidly connected to a hot water flowpath;
(ii) a cold water inlet, adapted to connect to a cold water source, and fluidly connected to a cold water flowpath,
said inlets fluidly connecting at a junction on said faucet body; and
(iii) a faucet outlet, adapted to deliver a stream received from said water flowpaths, via said junction;

(b) a controller;

(c) a first powered valve fluidly connected to said hot water flowpath, said valve being (i) characterized by a first valve flow coefficient function $C_H(\theta_H)$ that describes a flow-capacity of the valve as a function of valve position $\theta_H$ and (ii) responsive to said controller;

(d) a second powered valve fluidly connected to said cold water flowpath, said second valve being (i) characterized by a second valve flow coefficient function $C_C(\theta_C)$ that describes a flow-capacity of the valve as a function of valve position $\theta_C$ and (ii) responsive to said controller;

(e) a first temperature sensor and a second temperature sensor, said sensors associated with said faucet body, and operative to sense, respectively, a first measured temperature $T_H$ of a first fluid within said hot water flowpath, upstream of said first powered valve and a second measured temperature $T_C$ of a second fluid within said cold water flowpath, upstream of said second powered valve; and (f) a first differential pressure sensor unit, associated with said faucet body, said first differential pressure sensor unit adapted to obtain a direct measurement of a first pressure drop $\Delta P_H=(Ph-Pmix)$ across said first powered valve; and a second differential pressure sensor unit, associated with said faucet body, said second differential pressure sensor unit adapted to obtain a direct measurement of a second pressure drop $\Delta P_C=(Pc-Pmix)$ across said second powered valve;

said controller being adapted to receive:
(i) said first measured temperature $T_H$ from said first temperature sensor;
(ii) said second measured temperature $T_C$ from said second temperature sensors;

(iii) said first directly-measured pressure-drop $\Delta P_H$ from said first differential pressure sensor unit;
(iv) said second directly-measured pressure-drop $\Delta P_C$ from said second differential pressure sensor unit; and
(v) a temperature set-point $T_{set}$ and a flow-rate set-point $O_{set}$;

said controller being further adapted to:
(i) compute desired flows $O_{set\_h}$ and $O_{set\_c}$ respectively through the hot and cold inlets, from said temperature set-point $T_{set}$ and said flow-rate set-point $Q_{set}$, and by using heat-conservation and mass-conservation relations of the faucet;
(ii) calculate a first extent-of-opening set-point $\theta_{set\_H}$ by computing a first expression $$\theta_{set\_H} = C_H^{-1}\left(\frac{Q_{set\_H}}{\sqrt{\Delta P_H}}\right)$$

wherein $C_H^{-1}$ is an inverse of said first valve flow coefficient function $C_H(\theta_H)$;
(iii) in response to the calculation of said first expression, operate said first powered valve to said first calculated extent-of-opening set-point $\theta_{set\_c}$;
(iv) calculate a second extent-of-opening set-point $\theta_{set\_c}$ by computing a second expression $$\theta_{set\_c} = C_C^{-1}\left(\frac{Q_{set\_c}}{\sqrt{\Delta P_C}}\right)$$

wherein $C_C^{-1}$ is an inverse of said second valve flow coefficient function $C_C(\theta_C)$; and
(v) in response to the calculation of said second expression, operate said second powered valve to said second calculated extent-of-opening set-point $\theta_{set\_c}$.

2. The faucet of claim 1, further comprising a third temperature sensor, disposed downstream from said junction.

3. The faucet of claim 2, said controller adapted to modify said extent-of-opening set-points based on a feedback control scheme utilizing an input from said third temperature sensor.

4. The faucet of claim 1, said first extent-of-opening set-point being an explicit function of said first pressure drop and said first desired flow (Qset_h).

5. The faucet of claim 3, said controller adapted, within a particular loop iteration, to produce a calculated feed forward control result from said first and second pressure drops and said temperature information; to effect, within said particular control loop iteration, a combination of said calculated feed forward control result and a calculated feed back control result from said feedback control scheme; and to calculate said extent-of-opening set-points of said powered valves based on said combination.

6. The faucet of claim 1, pressure dependency of said first extent-of-opening set-point of said first powered valve being solely a function of said first pressure drop.

7. The faucet of claim 1, said controller further adapted to control said powered valves based on said extent-of-opening set-points, whereby a difference between the flowrate of the mixed stream and a set-point flowrate thereof, is kept within a second particular range.

8. The faucet of claim 1, wherein said first and second pressure drops form at least part of an aggregate differential pressure term, said extent-of-opening set-points depending on said aggregate differential pressure term, and wherein pressure dependency of said extent-of-opening set-points on discrete pressure is less than 10%, in absolute terms, of said aggregate differential pressure term.

9. The faucet of claim 1, wherein said first and second pressure drops form at least part of an aggregate differential pressure term, said extent-of-opening set-points depending on said aggregate differential pressure term, and wherein pressure dependency of said extent-of-opening set-points on discrete pressure is less than 5%, in absolute terms, of said aggregate differential pressure term.

10. The faucet of claim 1, wherein said extent-of-opening set-points and said first and second pressure drops form at least part of an aggregate differential pressure term, said extent-of-opening set-points depending on said aggregate differential pressure term, and wherein pressure dependency of said extent-of-opening set-points on discrete pressure is less than 3%, in absolute terms, of said aggregate differential pressure term.

11. The faucet of claim 1, pressure dependency of said first extent-of-opening set-point of said first powered valve being devoid of a contribution from discrete pressure.

12. The faucet of claim 1, pressure dependency of said first extent-of-opening set-point of said first powered valve being devoid of a contribution from discrete pressure information.

* * * * *